United States Patent
Dang et al.

(10) Patent No.: US 7,734,574 B2
(45) Date of Patent: Jun. 8, 2010

(54) INTELLIGENT SYSTEM HEALTH INDICATOR

(75) Inventors: Anh Tuan Dang, Round Rock, TX (US); Binh Hua, Austin, TX (US); Hong Lam Hua, Austin, TX (US); Elizabeth Silvia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1103 days.

(21) Appl. No.: 11/060,608

(22) Filed: Feb. 17, 2005

(65) Prior Publication Data

US 2006/0184714 A1 Aug. 17, 2006

(51) Int. Cl.
G06F 17/30 (2006.01)
(52) U.S. Cl. .............. 707/203; 707/3; 707/5; 707/204
(58) Field of Classification Search ........... 707/3, 707/5, 203–204; 717/121, 168, 711–731
See application file for complete search history.

(56) References Cited

U.S. PATENT DOCUMENTS

| | | | | |
|---|---|---|---|---|
| 6,151,643 A * | 11/2000 | Cheng et al. | ............. | 710/36 |
| 6,421,719 B1 * | 7/2002 | Lewis et al. | ............. | 709/224 |
| 6,636,983 B1 * | 10/2003 | Levi | ............. | 714/4 |
| 6,760,908 B2 | 7/2004 | Ren | ............. | 717/173 |
| 6,785,820 B1 * | 8/2004 | Muttik et al. | ............. | 726/24 |
| 6,832,373 B2 * | 12/2004 | O'Neill | ............. | 717/171 |
| 6,990,660 B2 * | 1/2006 | Moshir et al. | ............. | 717/171 |
| 7,080,372 B1 * | 7/2006 | Cole | ............. | 717/173 |
| 2002/0107901 A1 * | 8/2002 | Hay | ............. | 709/102 |
| 2002/0188937 A1 | 12/2002 | Webster et al. | ............. | 717/171 |
| 2002/0194434 A1 * | 12/2002 | Kurasugi | ............. | 711/137 |
| 2003/0065902 A1 | 4/2003 | Shiga et al. | ............. | 711/170 |
| 2003/0093506 A1 | 5/2003 | Oliver et al. | ............. | 709/221 |
| 2003/0110482 A1 | 6/2003 | Ferguson et al. | ............. | 717/168 |
| 2003/0220945 A1 | 11/2003 | Malik et al. | ............. | 707/203 |
| 2003/0229686 A1 * | 12/2003 | Kortright | ............. | 709/220 |
| 2004/0003266 A1 * | 1/2004 | Moshir et al. | ............. | 713/191 |
| 2004/0015938 A1 * | 1/2004 | Taylor | ............. | 717/174 |
| 2004/0015942 A1 | 1/2004 | Branson et al. | ............. | 717/168 |
| 2004/0073890 A1 * | 4/2004 | Johnson et al. | ............. | 717/124 |
| 2004/0123283 A1 | 6/2004 | Brown et al. | ............. | 717/171 |
| 2004/0187103 A1 * | 9/2004 | Wickham et al. | ............. | 717/168 |
| 2005/0027846 A1 * | 2/2005 | Wolfe et al. | ............. | 709/223 |
| 2005/0066019 A1 * | 3/2005 | Egan et al. | ............. | 709/223 |
| 2005/0071442 A1 * | 3/2005 | Becker et al. | ............. | 709/220 |
| 2006/0080656 A1 * | 4/2006 | Cain et al. | ............. | 717/174 |
| 2006/0184927 A1 * | 8/2006 | Deblaquiere et al. | ............. | 717/168 |
| 2007/0088759 A1 * | 4/2007 | Malik et al. | ............. | 707/200 |

* cited by examiner

*Primary Examiner*—Don Wong
*Assistant Examiner*—Hanh B Thai
(74) *Attorney, Agent, or Firm*—Justin M. Dillon; Yee & Associates

(57) ABSTRACT

A method, apparatus, and computer instructions for handling updates. A database is queried to determine an effect of the update on the data processing system in response to detecting an update for the data processing system. A configuration of the data processing system is used in querying the database. A health status of the data processing system is selectively modified using the response to form a modified health status in response to receiving a response from the database.

11 Claims, 5 Drawing Sheets

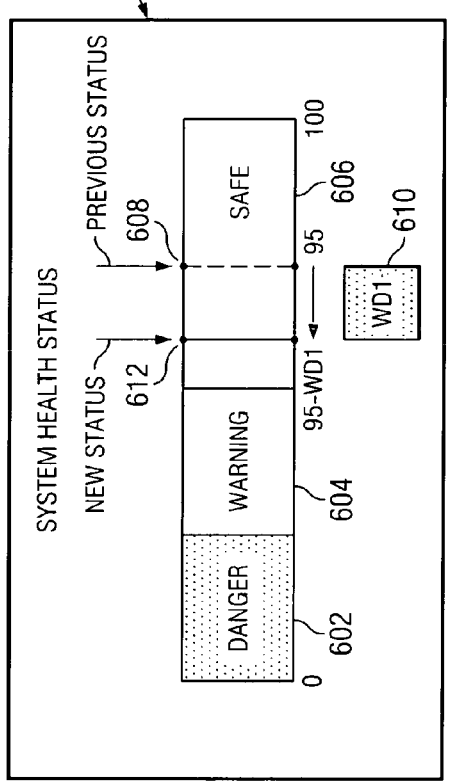
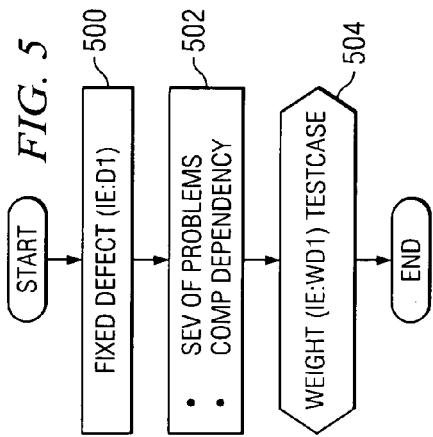

INTELLIGENT SYSTEM HEALTH INDICATOR

BACKGROUND OF THE INVENTION

1. Technical Field

The present invention relates to an improved data processing system and in particular to a method and apparatus for updating data processing systems. Still more particularly, the present invention relates to an improved method, apparatus, and computer instructions for determining when an update should be applied to a data processing system.

2. Description of Related Art

Vendors currently provide updates to software and firmware on a regular basis. For example, a software update is any update, update rollup, service pack, future pack, critical update, or security update that is used to improve or fix a product. Typically, an update is a broadly released fix for a specific problem. An update may address non-critical and non-secure related bugs. Additionally, firmware updates may be provided for hardware. In these examples, updates also may include upgrades for the software which runs on the clients. For example, a software update may be provided for a network adapter. In a similar fashion, firmware may be provided to update the network adapter.

In providing these updates, vendors typically distribute them through the Internet. Client programs, such as agents, are employed on clients to identify and receive updates. Updates may be automatically applied or selectively applied through a user input.

It is often difficult for system administrators to figure out when a particular client system is in need of an update. Software and firmware fixes from vendors may be released very frequently. Not all vendor updates released, however, are needed for every client in the system. On the other hand, some updates are very critical for other clients. As a result, identifying which updates to apply to which data processing systems becomes a difficult and time-consuming task for system administrators to accurately maintain hundreds of thousands of data processing systems under their control.

Today, vendors typically only notify an administrator of updates with the description of the issue being addressed. The decision of whether to apply an update is up to the discretion of the system administrator. The system administrator must then review each update in detail to determine whether to apply the update. This process is a time-consuming task and requires the administrator to understand the systems which may be affected by the many different updates. Although automatic update systems are available, many administrators disable these systems to avoid application of updates before the updates are verified as compatible. Thus, this process may require some qualification or verification test before deploying an update into a network. For a large data center, this process frequently results in delays in updates with software and hardware continuing to execute a potentially risky state with lower versions of code.

Therefore, it would be advantageous to have an improved method, apparatus, and computer instructions for determining when to apply updates to a data processing system.

SUMMARY OF THE INVENTION

The present invention provides an improved method, apparatus, and computer instructions for handling updates. A database is queried to determine an effect of the update on the data processing system in response to detecting an update for the data processing system. A configuration of the data processing system is used in querying the database. A health status of the data processing system is selectively modified using the response to form a modified health status in response to receiving a response from the database.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating a process for generating update information for a knowledge base in accordance with a preferred embodiment of the present invention;

FIG. 6 is a diagram illustrating a system health status indicator in accordance with a preferred embodiment of the present invention;

FIG. 7 is a diagram illustrating health status information for managed systems in accordance with a preferred embodiment of the present invention;

DETAILED DESCRIPTION OF THE PREFERRED EMBODIMENT

Figure 1:
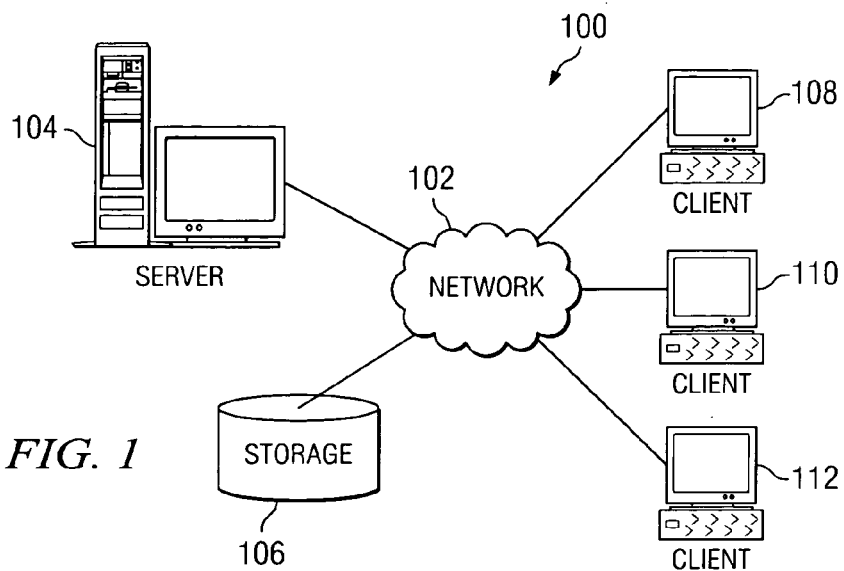
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
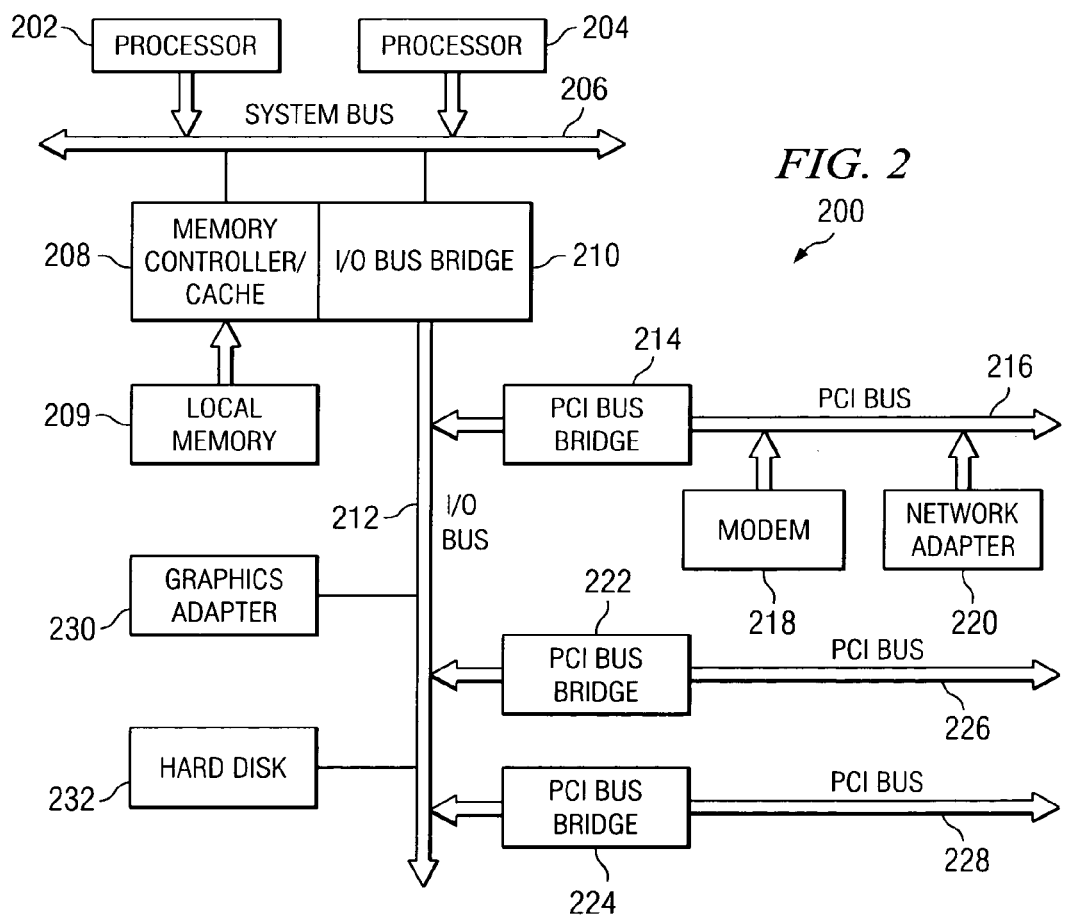
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
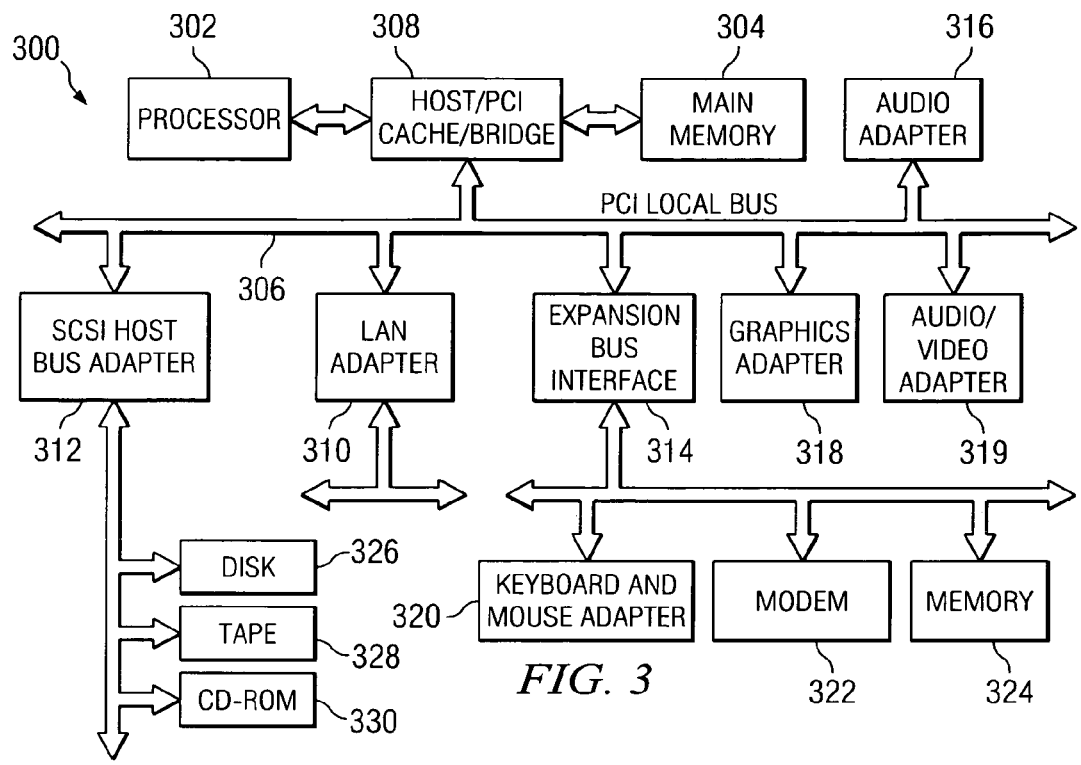
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions to enhance the handling of updates to data processing systems. In response to detecting an update from the data processing system, a database is queried to determine the effect of the update on the data processing system. The configuration of the data processing system is used in querying the database in these illustrative examples. The health status of the data processing system is selectively modified using a response received from the query made to the database. This health status forms a modified health status, which is used to determine whether to apply the update.

In these illustrative examples, employees use an intelligent knowledge base tool to track all system hardware and software configurations. When a new hardware software update is released, the information is typically entered into the knowledge base. This knowledge base is used to intelligently identify which systems are affected by the update. Further, the knowledge base may be used to inform administrators or other users as to which systems need to be updated to avoid future problems associated with this specific update.

In particular, this knowledge base tool is used to assign a health indicator to each data processing system. The health indicator is assigned based on the configuration of a particular data and a particular update. When a new software or hardware update is released from a vendor, the database is updated. The information is then processed by intelligent knowledge bases for risk assessment. For example, different risks are associated with not applying an update right away. Another risk may be associated when applying an update to a critical system without an environmental qualification test.

When updates are released, which are related to the system function or component, the health indicator for the data processing system is updated to report the possible impact associated with not applying the change. In these illustrative examples, the presence of an unapplied update downgrades the health indicator for the data processing system. Any data processing system may temporarily run without certain updates to report when the health indicator of the data processing system reaches a critical point and a mandatory update is determined to be required. This information is identified through the display of health indicators for different clients.

Further, the mechanism of the present invention tracks the health of the data processing system and provides the status to the administrator specifying which systems need to be updated before a problem may happen. The health status also may provide suggestions on the types of tests necessary for applying changes to a particular data processing system. An example is involves a software update that released from the vendor to correct a transmit segmentation offload (TSO) issue on an Ethernet adapter. The suggestion provided may include network tests, such as FTP, telnet, RCP, which are good regression tests because Ethernet is a network device.

In this manner, the mechanism of the present invention provides for handling system updates in a manner that reduces the time needed to identify which updates need to be made to which systems within a network data processing system. With this mechanism, system administrators and other users who manage data processing systems may more easily determine which updates are truly critical for particular data processing systems. Additionally, this mechanism also allows administrators and users to identify risks associated with applying an update to a system without prior testing of the update.

Figure 4:
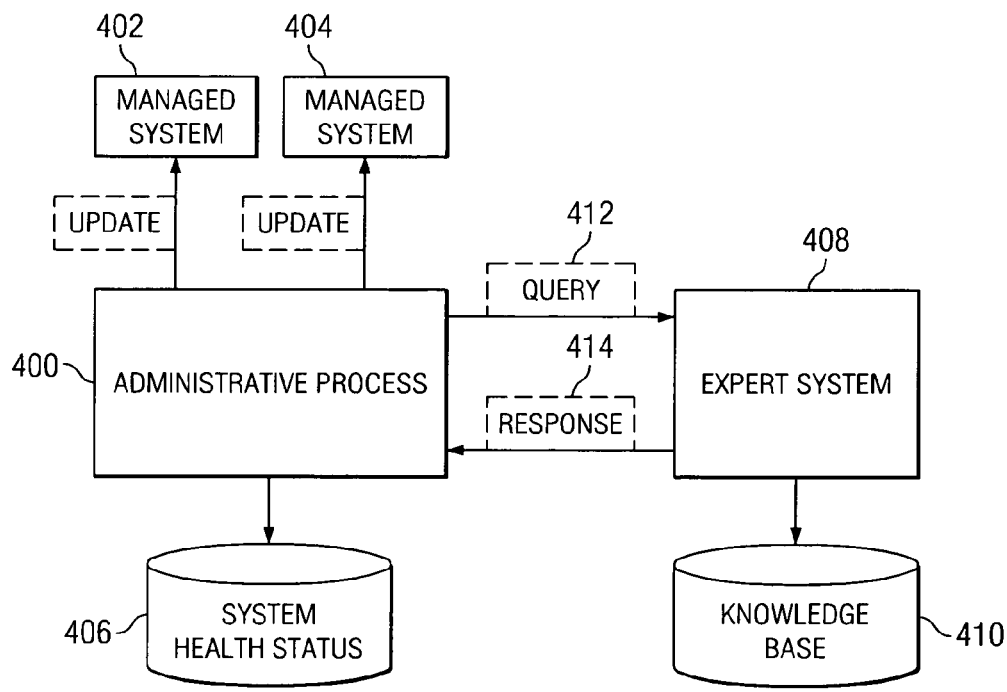
FIG. 4 is a diagram illustrating components used in providing intelligent system health indications in accordance with a preferred embodiment of the present invention.

With reference now to FIG. 4, a diagram illustrating components used in providing intelligent system health indications is depicted in accordance with a preferred embodiment of the present invention. In this example, administrative process 400 manages managed systems 402 and 404. Administrative process 400 may be implemented in a data processing system, such as data processing system 200 in FIG. 2 or data processing system 300 in FIG. 3. Managed system 402 and 404 may be a client or server, such as data processing system 300 in FIG. 3 or data processing system 200 in FIG. 2.

In these examples, administrative process 400 is employed to remotely apply updates to managed systems 402 and 404. Depending on the particular implementation, the updates may be manually performed by a user or by an administrator actually traveling to the location of each managed system. Administrative process 400 tracks the system health of each managed system using system health status database 406. This database contains the system health of managed systems 402 and 404. An administrator or user interacting with administrator process 400 may view the system health of managed system 402 and 404.

In this example, expert system 408 along with knowledge base 410 form an intelligent knowledge base tool used to keep track of system software and hardware configurations. Knowledge base 410 is a database of rules used by artificial intelligence applications. In this example, expert system 408 is an example of artificial intelligence application that uses knowledge base 410 for problem solving. Answers to queries or questions are derived by using expert system 408 to obtain information from knowledge base 410. Knowledge base 410 is maintained by a third party for use by administrators. In some cases, the third party may be a vendor or group of vendors.

In these illustrative examples, each time a new software or hardware update is released, the information is entered into knowledge base 410. This knowledge base intelligently identifies which types of systems are affected by the update. This information on updates may supplied by vendors to the managers of knowledge base 410. The information may be manually entered or received in a format that is directly imported into knowledge base 410, without requiring a user to enter the information. Further, knowledge base 410 may identify how updates affect different types of hardware and software configurations.

For example, when a new system firmware update is released to correct a remote IPL function of the integrate Ethernet port, a first data processing system may not need a new firmware update because it is not using the remote IPL function. A second data processing system with the same hardware and software configuration may need to update because this data processing system is performing remote IPL every day. This information may be processed by expert system 408 to provide risk assessment. For example, although expert system 408 may identify the risk associated with not applying the fix right away, the risk associated with applying a fix to a critical system without an environmental qualification test and the risk of applying the particular update when other updates have or have not been applied to a particular system configuration may be greater. The risks may be displayed generally to the user in a number of different ways in these illustrative embodiments. One of the possible ways for displaying the risk involves using the three LEDs to indicate health and risk levels of the data processing system. For example, an expert system can program the color of LED to indicate the risk, and the number will show the health on the system. For example, when a data processing system shows a 90% health with red color LED, it means an update is applied but a qualification test is needed.

In these illustrative examples, when updates are released which relate to a system for example, the health for the particular system is updated to report any possible impact associated with not applying the change. For example, when an update is identified or detected, administrative process 400 generates query 412 to send to expert system 408. In these illustrative examples, query 412 may contain configuration information for a particular managed system, such as managed system 402. The configuration information is used in identifying the impact on a particular client.

Upon receiving query 412, expert system 408 processes query 412 using knowledge base 410 to identify any impact that may be associated with not applying the upgrade. This information is returned by expert system 408 in response 414 to administrative process 400. The system health status for managed system 402 is then updated to reflect the impact associated with not applying the change in question. For example, when a 1 Gb Ethernet Fiber adapter of vendor A has a new firmware update, administrative process 400 generates query 412 to send to expert system 408 to search for any systems that have vendor A 1 Gb Ethernet fiber adapters. Expert system 408 returns response 414 to administrative process 400 to identify the managed systems and the impact of each affected managed system. In this example, a high impact is present if the managed system uses vendor A Ethernet adapter as a primary network interface. A low impact is present if the vendor A adapter is used as a standby adapter in the managed system. This information is included in knowledge base 410 for use by expert system 408. In many cases, any system may temporarily run without certain updates. At some point, the health of a particular managed system may reach a threshold that requires an upgrade. Administrative process 400 tracks the health status of managed systems 402 and 404 in system health status 406, updating the health status of each managed system as updates are detected. With system health status 406, alerts or indications of the health status of each managed system may be presented to a user or administrator.

Additionally, the status also may provide suggestions on the types of tests that should be run for a particular update before applying changes to a critical system, such as a server. The indication of the health status may be provided as a graphical indicator or in the form of text or similar other type alert to provide the health status information to a user.

Turning now to FIG. 5, a diagram illustrating a process for generating update information for a knowledge base is depicted in accordance with a preferred embodiment of the present invention. As illustrated, the process begins by identifying fixed defect. For example, developers for a vendor may find a bug or error in a code for a particular component, such as a communications adapter. In this illustrative example, the problem was found when the communications adapter was performing a data backup using large packet sizes. The vendor fixes the defect and releases this update. When this update is released, the fixed defect is identified (step 500). The nature of the update is identified (step 502). The update can be classified as different types. For example, the update may be classified as software or hardware, CPU or I/O adapter, application or operating system kernel, and network or storage. In these examples, the dependency and severity of the problem with regard to a software and/or hardware components is identified in step 502. Upon identifying the nature of the updates in step 504, a weight value is generated as well as a testcase (step 504) with the process terminating thereafter. The weight value of each update, in these illustrative examples, is based on the severity of the fixed issue. For example, the performance enhancement is not assigned as high of a value as a process core dump. Data integrity is higher than the core dump. Additionally, the update could be labeled as critical by the vendor. Such a labeling may be assigned a particular weight value. In assigning a weight value, whether prior updates are needed for the current update are taken into account. The weight value is placed into a knowledge base, such as knowledge base 410 in FIG. 4. Additionally, the potential test case also is placed into a knowledge base, such as knowledge base 410 in FIG. 4. In these examples, the test case is used to test the area or function of the new update.

In this manner, a system administrator may request a health status change for a managed system by sending a query to an expert system associated with the knowledge base. For the particular managed system, a weight value is returned to the administrator process and a system health status for the particular managed system may be updated. An indication also may be graphically provided to the administrator.

Turning now to FIG. 6, a diagram illustrating a system health status indicator is depicted in accordance with a preferred embodiment of the present invention. In this example, system heath status indicator 600 has a scale from 0 to 100. Various cells are present in system health status indicator 600. In this example, danger zone 602, warning zone 604, and safe zone 606 are present. The previous status of the managed systems is identified by dotted line 608, which indicates that the managed system is in a safe zone. After an update is identified, the administrator may query an expert system to identify the effect of the update on the particular managed system. In this illustrative example, weight value WD1 610 is returned. As a result, system health status indicator 600 is updated to report the new status at line 612. As can be seen in this illustrative example, the system health status of the particular managed system has been reduced by the value WD1. The health status of the managed system is still in safe zone 606. As a result, the administrator may choose to wait to apply this particular update. If the system health status moves into warning zone 604, the urgency of the update is greater and the administrator may choose to apply the update sooner rather than later. With a change in the system health status of the managed system moving into danger zone 602, the administrator may choose to immediately apply the update even without possible looking at a test case With system health status indicator 600, an administrator may use this indicator to plan system update accordingly. With these indicators, an administrator can effectively schedule the testing and update window for this and other managed systems to keep all the managed systems in a network data processing system up-to-date. By providing these indicators to allow the scheduling and prioritizing of updates, system downtime is reduced by avoiding having out-of-date software or not having critical updates applied to a system in a timely manner.

In these examples, health status indicator 600 displays the health status for a single data processing system. Health status indicator 600 may provide health status information for multiple data processing systems. For example, additional lines, such as line 612, may be presented for each additional data processing system. Additionally, health status indicator may take other forms, such as that of a bar in FIG. 6. For example, a circle or pie type diagram may be used. Also, other numbers of zones and types of zones may be implemented. For example, danger zone 600 may read as "apply update immediately", warning zone 604 may read "schedule update soon", and safe zone 606 may read as "no action needed".

Turning now to FIG. 7, a diagram illustrating health status information for managed systems is depicted in accordance with a preferred embodiment of the present invention. In this example, table 700 includes strings of information for various managed systems. Table 700 illustrates information that may be contained in a database, such as system health status 406 in FIG. 4. In this example, entries 702, 704, 706, and 708 are present in table 700. Each entry contains an identification of a managed system, software configuration for the managed system, hardware configuration for the managed system, health status, and a regression test case which may be used for a particular update.

When a new update is received, software and hardware configuration, such as that found in entry 702 may be sent in a query to an expert system to determine the effect of the update on the managed system in entry 702. A weight value is returned, which is applied to the health status in the entry to generate a new health status. The health status information may be presented to the administrator for use in determining when to apply an update. In these illustrative examples, colors are one mechanism used as risk indicators and a percentage as the health of the system also is used to provide risk information. When an update is applied to a data processing system, the percentage of health of the system can be improved, but the color can be changed from yellow to red (green as healthy, yellow as minimum risk, orange as high risk and red as critical). The reason the color changes from yellow to red is because the update requires other updates, which have not been needed by this system. One of these updates is the operating system kernel update.

Further, information about the cause of a risk also may be presented to a user. For example, if an update requires selected prior updates that are not present on a managed system, the identification of these prior updates may be presented to the user in addition to other health status information. The cause is presented to the user in the form of text in these examples. This information about installed updates and the risk of not having the prior updates may be obtained from system health status or knowledge base 410 in FIG. 4. The updates installed in a managed system may be maintained in system health status 406. The risk of lacking the prior updates may be located in knowledge base 410 in these illustrative examples.

Figure 8:
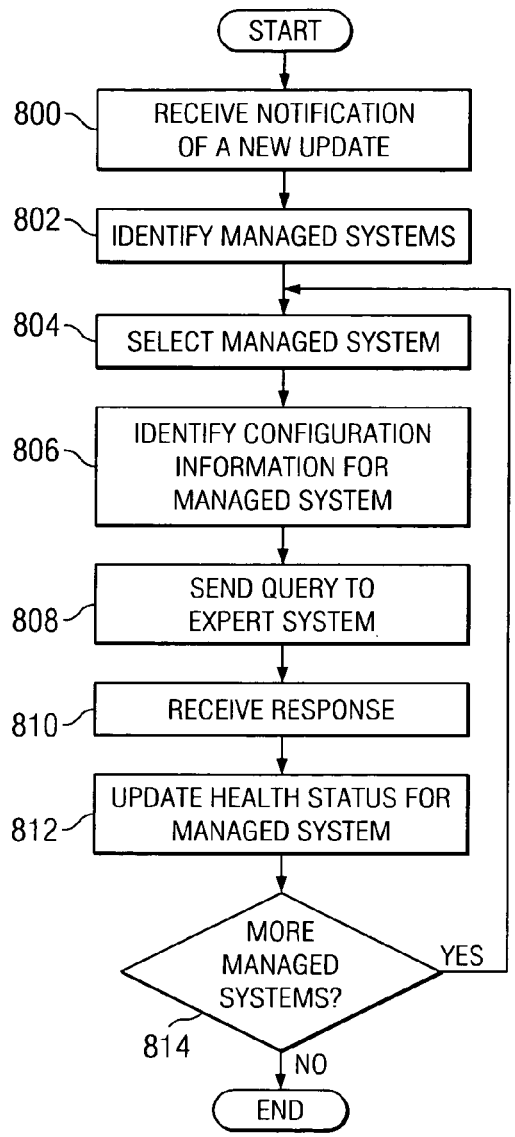
FIG. 8 is a flowchart for updating system health status for managed systems in accordance with a preferred embodiment of the present invention.

Turning now to FIG. 8, a flowchart for updating system health status for managed systems is depicted in accordance with a preferred embodiment of the present invention. The flowchart illustrated in FIG. 8 may be implemented in a process such as administrative process 400 in FIG. 4.

The process begins by receiving notification of a new update (step 800). A managed system is identified (step 802). The managed system is then selected (step 804). Configuration information is identified for the managed system (step 806). A query is sent to an expert system (step 808). A response is received (step 810). The health status for the managed system is updated (step 812). A determination is made as to whether more managed systems are present (step 814). If more managed systems are not present, the process terminates thereafter. If more managed systems are present, the process returns to step 804 to select a managed system.

Figure 9:
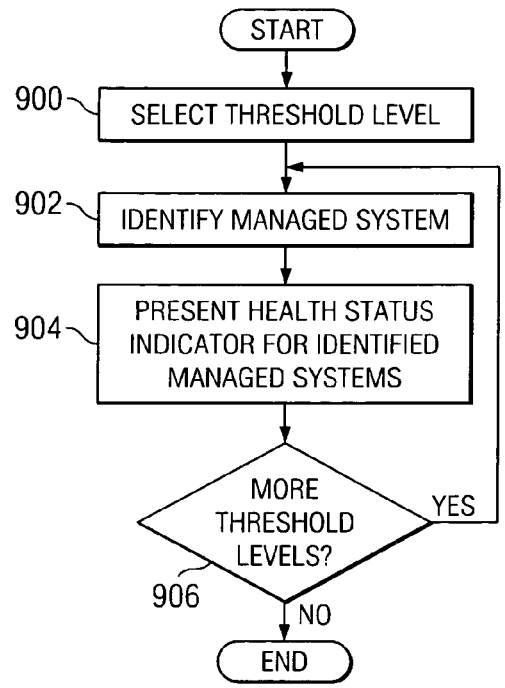
FIG. 9 is a flowchart of a process for present health status information in accordance with a preferred embodiment of the present invention.

With reference next to FIG. 9, a flowchart of a process for presenting health status information is depicted in accordance with a preferred embodiment of the present invention. In this illustrative example, the process illustrated in FIG. 9 may be implemented in a process, such as administrative process 400 in FIG. 4.

The process begins by selecting a threshold level for processing (step 900). In this illustrative example, this threshold level may be a threshold for a zone, such as danger zone 602, warning zone 604, or safe zone 606 in FIG. 6. The managed systems for the threshold level are identified (step 902). Thereafter, a health status indicator is presented for each identified managed system within the threshold level (step 904). Next, a determination is made as to whether any additional threshold levels have been selected for processing (step 906). If additional threshold levels have been selected, the process returns to step 902; otherwise, the process terminates.

Using this process, an administrator may see all of the systems that fall within certain zones, such as those presented in FIG. 6. With this information, a user, such as an administrator, may plan when to apply updates. For example, in identifying all of the managed systems that are in a danger zone, the system administrator may give those managed systems priority over other managed systems when scheduling installation of updates.

Further, in presenting the health status indicator for the managed systems, this process also may include a test case that may be one part to applying those updates. The health status indicator may be presented in the manner illustrated in FIG. 6. For example, rather than using a health status indicator for each individual managed system, a graph or pie chart or diagram may be used to identify the number of managed systems that fall within particular zones or threshold levels. Of course, the mechanism of the present invention may be applied using any type of indication system to present the information to the user.

As an example, if a vendor finds a problem with a jumbo frame feature on a 1 GB Ethernet adapter, the vendor releases an update to fix the problem to its customers. If a system configured with the jumbo frame feature will have a different indication on the health status indicator from the system that does not have that feature configured, the system with the feature needs the update, while the other system does not. The indicator reflects whether this need is critically necessary. For example, the system with the feature shows a decrease in the health status without the fix.

Another example of the usefulness of the health status indicator provided by in these illustrative examples is with an engineering change to a SCSI adapter. Two identical systems run applications that require a slightly different version of the same hardware. A user may assume that both systems are equivalent and can be used to back each other when they are not the same. The health indicator for one system may indicate that the system is fine, while the health indicator for the other system may indicate that that an update is needed to avoid a failure. The health system indicator in these illustrative examples may allow the user to monitor the health level and avoid an expected failure that could be averted through obtaining the correct update.

These updates may be planned by the user administrating or overseeing the different systems. Additionally or in the alternative, certain updates may be automatically scheduled based on the health status.

Figure 10:
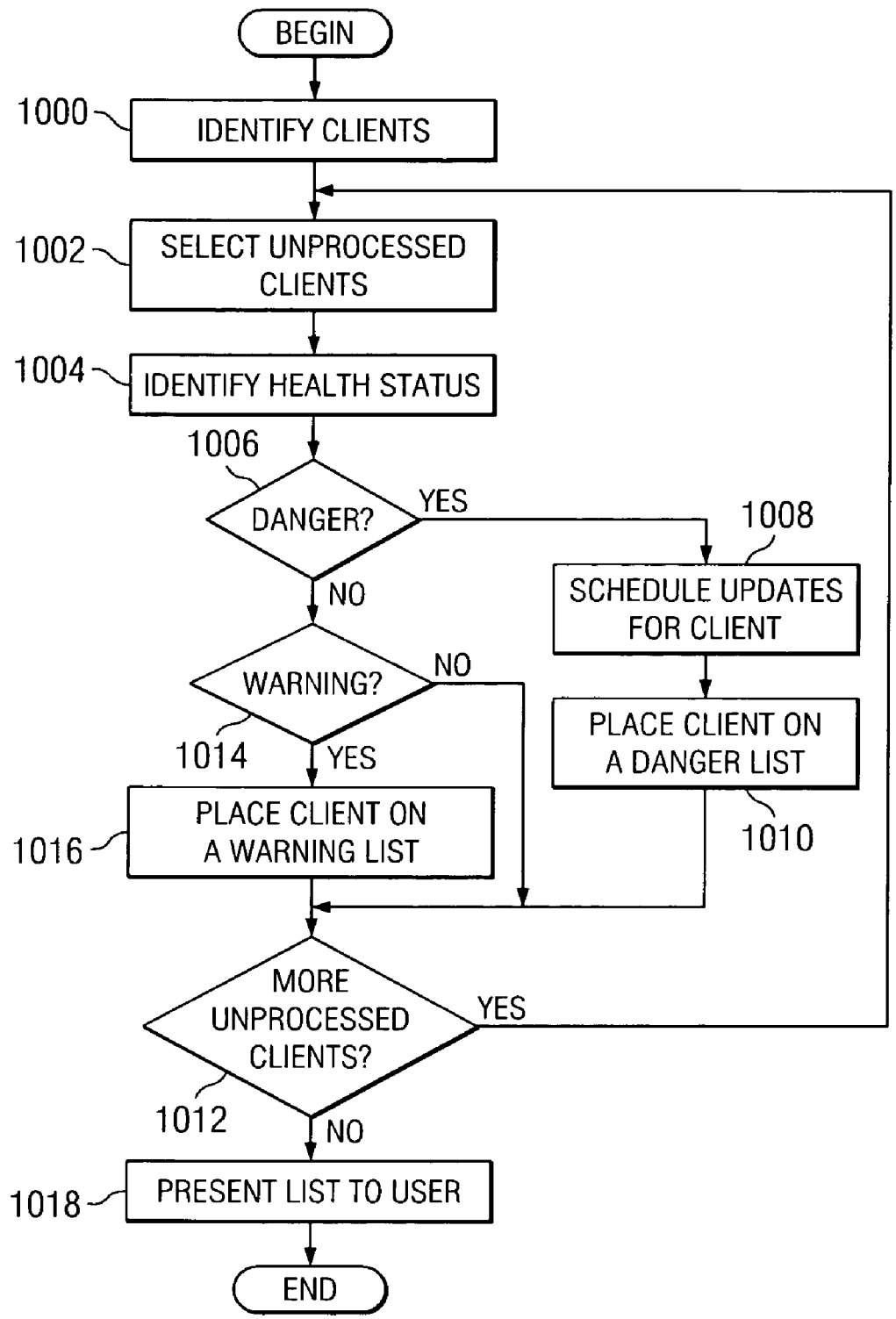
FIG. 10 is a flowchart of a process for scheduling updates using health status indicator in accordance with a preferred embodiment of the present invention.

With reference to FIG. 10, a flowchart of a process for scheduling updates using health status indicator is depicted in accordance with a preferred embodiment of the present invention. The process illustrated in FIG. 10 may be implemented in a component, such as administrative process 400 in FIG. 4.

The process begins by identifying clients that are being managed (step 1000). Next, an unprocessed client from the identified clients is selected for processing (step 1002). The health status for this client is identified (step 1004). A determination is made as to whether the health status is in a danger zone (step 1006). If the health status is within a danger zone, an update is automatically scheduled for the client (step 1008). Then, the client is placed on a danger list (step 1010).

Thereafter, a determination is made as to whether additional unprocessed clients are present (step 1012). If additional unprocessed clients are present, the process returns to step 1002. With reference again to step 1006, if the health status is not in a danger zone, a determination is made as to whether the health status is in a warning zone (step 1014). If the health status is in a warning zone, the client is placed on a warning list (step 1016) with the process then proceeding to step 1012 as described above. Otherwise, the process proceeds directly to step 1012.

In step 1012, if all of the clients have been processed, the lists are presented to the user (step 1018 with the process terminating thereafter. These lists may be presented in various ways. For example, these lists may merely take the form of text identifying clients for each health status zone. Additionally, the time of when an update has been schedule may be presented. Further, these lists may be presented in a graphical form using an indicator, such as health status indicator 700 in FIG. 7.

Thus, the present invention provides an improved method, apparatus, and computer instructions for indicating system health status for managed systems. When an update is detected, a query may be made to identify the effect of the update on each managed system. The effect of the update is then used to adjust the managed system health status. Based on the adjusted managed system health status, a plan for applying updates may be implemented.

In this manner, an administrator may view the system health status for different managed systems within a network data processing system. With this information, an administrator is able to effectively schedule the testing and update windows needed to keep systems up to date.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for handling updates by an administrative system, the method comprising the computer implemented steps of:
   responsive to detecting an update for a data processing system, querying a database to determine an effect of the update on the data processing system, wherein a configuration that identifies both hardware and software of the data processing system is used in querying the database, and wherein the effect of the update obtained by the querying of the database includes a risk of not applying the update;
   responsive to receiving a response from the database that includes the effect, selectively modifying a health status of the data processing system using the response to form a modified health status, wherein the health status and the configuration are maintained in another database; and
   visually presenting the effect of the update to a user of the administrative system.

2. The method of claim 1, wherein the effect of the update is visually presented to the user for a plurality of different data processing systems having different respective health statuses.

3. The method of claim 2, wherein the effect includes a cause of the risk that is visually presented to the user.

4. The method of claim 1, wherein the another database further comprises a list of regression test cases associated with the update that should be run on the data processing system after the update has been applied at the data processing system.

5. The method of claim 1, wherein the querying step includes:
   sending a query to an expert system associated with the database, wherein the expert system is not the data processing system.

6. The method of claim 1 further comprising:
   scheduling application of the update for the data processing system based on the modified health status, wherein if the modified health status corresponds to a danger status the application for the update is automatically scheduled to occur.

7. The method of claim 1, wherein the modified health status includes a risk of not applying the update.

8. The method of claim 1 further comprising:
   selectively applying the update to the data processing system based on the modified health status of the data processing system.

9. The method of claim 1, wherein the response includes a test case and further comprising:
   running the test case to determine whether to apply the update to the data processing system.

10. The method of claim 1 further comprising:
    calculating a weight value for the update, wherein the weight value is used to selectively modify the health status of the data processing system.

11. An administrative data processing system comprising:
    a bus;
    a communications unit connected to the bus;
    a memory connected to the bus, wherein the memory includes a set of instructions; and
    a processor unit connected to the bus, wherein the processor unit executes the set of instructions to perform a method to handle updates; the method comprising
    querying a database to determine an effect of an update on a data processing system in response to detecting the update for the data processing system, wherein a configuration that identifies both hardware and software of the data processing system is used in querying the database, and wherein the effect of the update obtained by the querying of the database includes a risk of not applying the update;
    selectively modifying a health status of the data processing system using a response to the querying to form a modified health status in response to receiving the response from the database that includes the effect, wherein the health status and the configuration are maintained in another database; and
    visually presenting the effect of the update to a user.

* * * * *